Nov. 8, 1938.    S. C. COEY    2,136,003
SPRAY ELIMINATOR
Filed April 24, 1936    2 Sheets-Sheet 1
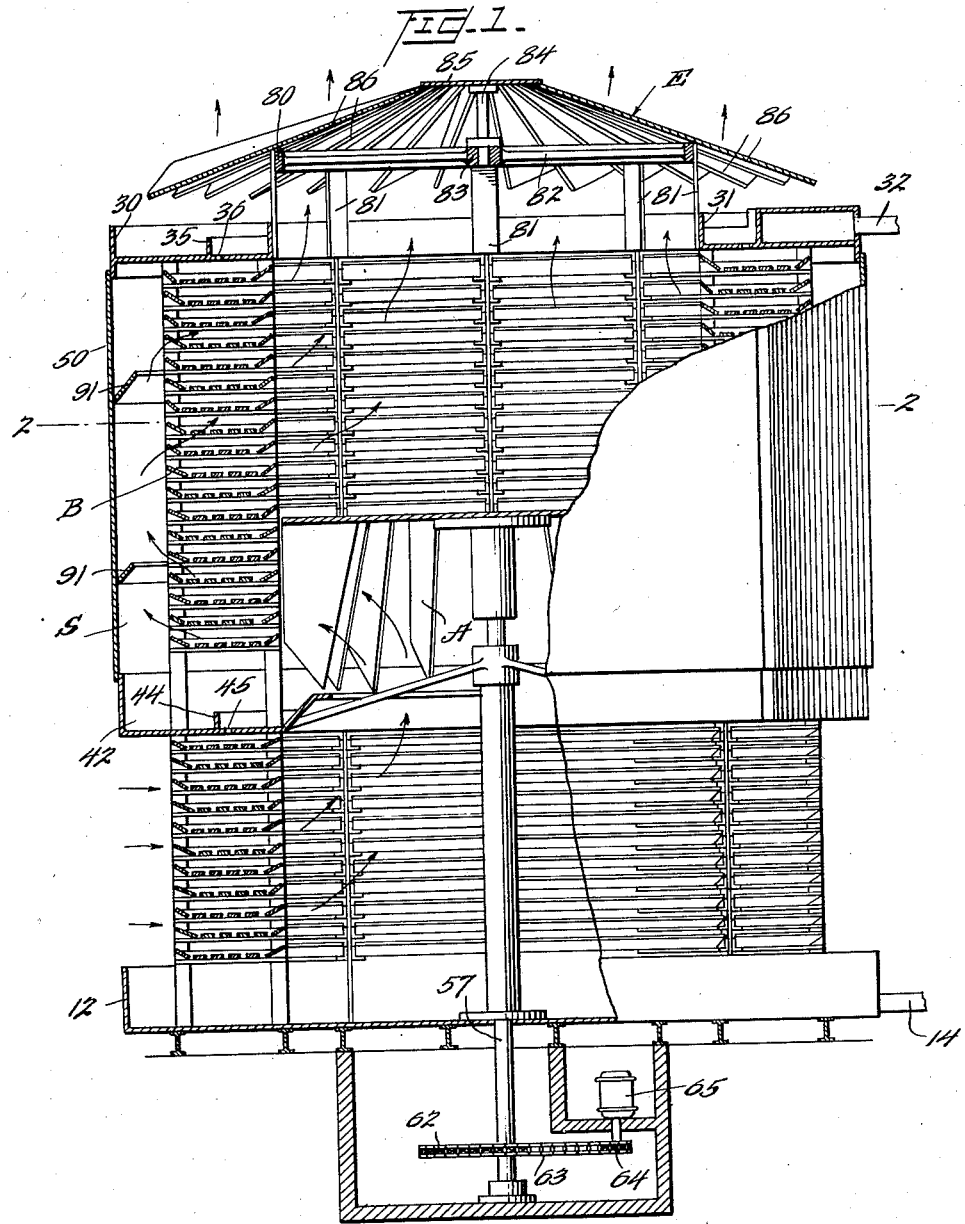
Inventor
Stewart C. Coey,
By Watson, Coit, Morse
& Grindle
Attorneys

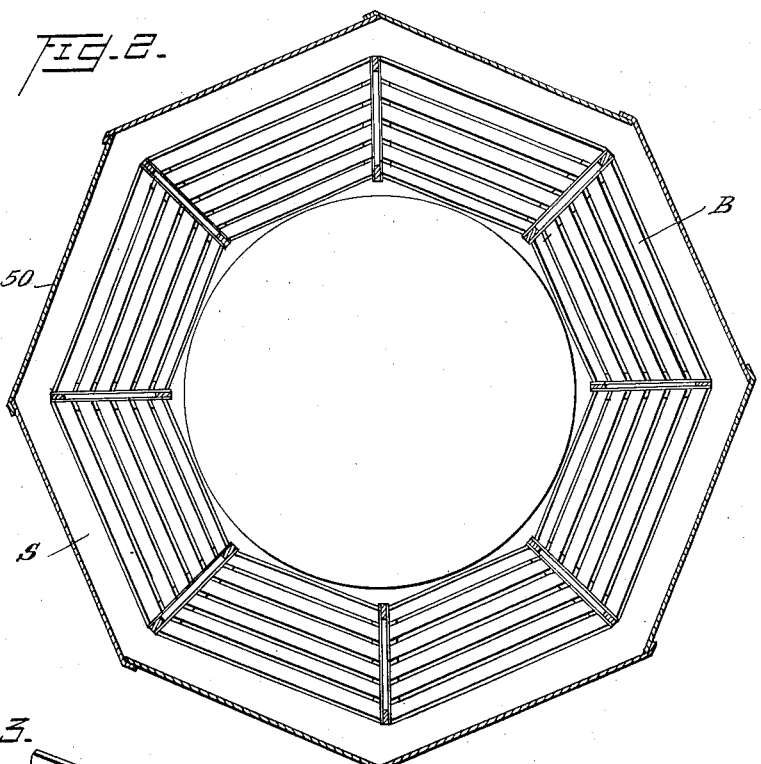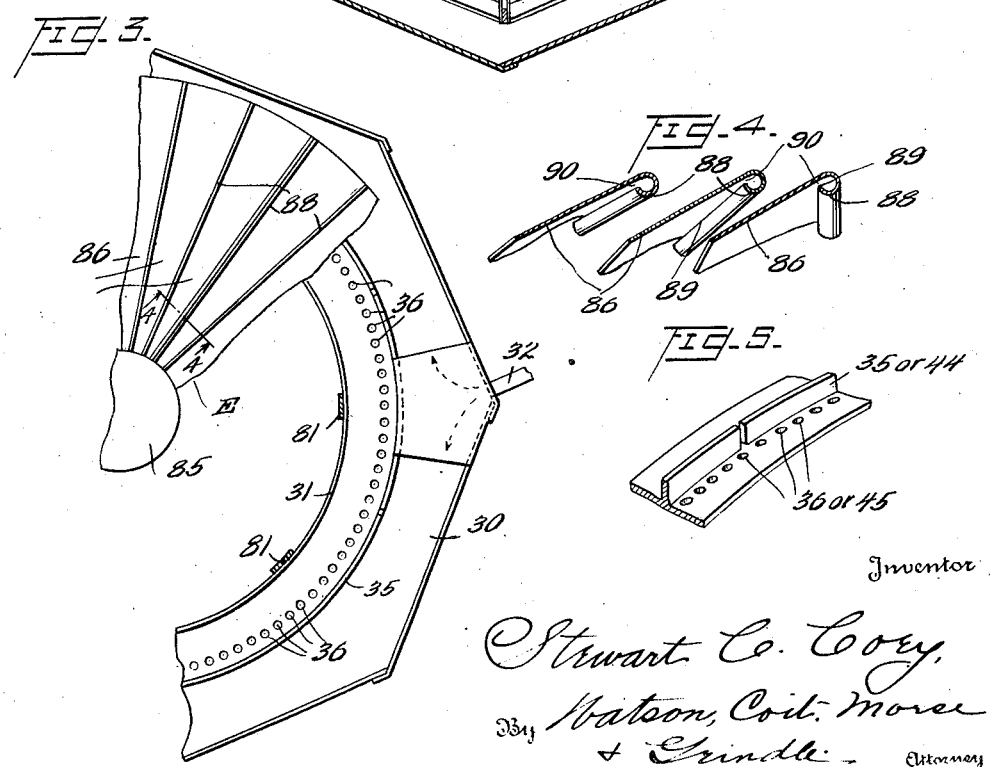

Patented Nov. 8, 1938

2,136,003

UNITED STATES PATENT OFFICE 2,136,003

SPRAY ELIMINATOR

Stewart Clark Coey, Glen Ridge, N. J.

Application April 24, 1936, Serial No. 76,274

1 Claim. (Cl. 183—75)

This application, which is a continuation in part of my application No. 683,860, filed August 5, 1933, relates to spray eliminators, and more particularly to such devices adapted to be employed with a cooling tower.

The spray eliminator of the present invention acts to remove entrained moisture from the upwardly moving air current in a cooling tower or the like by changing the velocity and direction of the current and catching the moisture droplets which tend to continue in a straight line and returning them directly to the receptacle for hot liquid whereby they are again delivered into the tower for cooling.

Other objects and features of novelty will be apparent from the description taken in connection with the drawings in which:

Fig. 1 is a vertical central section through a cooling tower equipped with a spray eliminator constructed in accordance with the present invention;

Fig. 2 is a horizontal section taken substantially on the line 2—2 of Fig. 1;

Fig. 3 is a fragmentary plan view of a cooling tower with part of the spray eliminator broken away to show the interior construction;

Fig. 4 is a fragmentary sectional elevation taken substantially on the line 4—4 of Fig. 3 and looking in the direction of the arrows, showing the arrangement of the spray eliminator vanes and the troughs for cooling the water precipitated on the vanes; and Fig. 5 is a fragmentary view illustrating the dams 35 and 44.

For purposes of illustration, the spray eliminator is shown as associated with a cooling tower which may be of any construction having an air outlet at the top thereof.

The particular cooling tower illustrated in the drawings comprises a vertically arranged series of baffles, B, which, in plan view may be termed as being of annular shape. At the top of the baffles, there is provided a trough 30 supplied with the liquid to be cooled through the pipe 32. This trough may be provided with a dam 35 illustrated in detail in Fig. 5. The liquid passes through the apertures 36 and falls on the upper baffle, thence it descends from baffle to baffle until it is collected in a trough 42 disposed intermediate the height of the baffles. This trough 42 is provided with a dam 44 similar to the dam 35 and apertures 45 in the bottom thereof through which the liquid passes and is delivered to the baffle directly under said trough 42. Thence the liquid descends from baffle to baffle, the cooled liquid being collected in the tray 12 and discharged therefrom by means of pipe 14.

In this particular cooling tower, the air for evaporating liquid to cool it passes through the curtains of falling liquid three times. For this purpose the tower is arranged in what may be termed three vertical sections. The air enters from the outside of the tower through the bottom section as indicated by the arrows, and thence it passes to the inlet of an air circulating device A, arranged at about the same elevation as the second section of baffles. In the arrangement shown this air circulating device is in the form of a squirrel cage type of fan. The air is discharged therefrom radially outwardly through the second section of baffles, the trough 42 acting to prevent any of this discharged air being returned to the suction of the fan. The fan is mounted on a vertical shaft 57 driven by a motor 65 by means of the sprockets 62 and 64 and the chain 63.

Disposed around the outside of the two upper sections of the tower and spaced therefrom is a casing 50. The air discharged from the fan through the second section of the baffles is delivered into the annular space S formed between the casing 50 and the baffles, and due to the casing and baffles 91, this air is redirected through the third or uppermost section of the baffles back to the interior of the tower. Thence this air passes upwardly through the spray eliminator E which serves to remove entrained water and return the same to the upper trough 30. The present invention is directed to the construction and arrangement of this spray eliminator.

In the form shown, this spray eliminator may be briefly defined as a stationary fan of the multibladed propeller type. This fan is removably supported from the rim of a horizontal wheel 80 carried by a plurality of struts 81 secured around its periphery and extending downwardly and being attached to the flange 31 of the top trough 30. The wheel is of substantially the same diameter as this flange and is equipped with spokes 82 mounting a hub 83 which removably supports a bar 84 to the upper end of which is attached a flat, circular, metal plate 85.

The plate 85 and the wheel 80 form two supports for each of the blades or vanes 86 of the spray eliminator, which in general appears as a frustum of a cone as seen in Fig. 1. Each blade has its upper or inner end secured beneath plate 85 and its intermediate portion resting on the ring 80. In general each blade inclines downwardly so that water from its under surface drips downwardly by gravity and falls from the end of the vane which is mounted directly over the outer section of the upper water trough so that the water is returned for use. Each vane 86 is inclined in a transverse manner at about 40° to the horizontal as seen in Fig. 4 and each blade overlaps materially the succeeding blade so that air cannot pass directly vertically out of the tower but is broken up into minor streams, all given an inclined movement by virtue of the stationary fan-like eliminator blades which have the reverse action on a moving column of air as a rotary fan would have on a stationary body of air, i. e., it imparts a more or less lateral spreading movement thereto.

The upper or outer or trailing edge of each vane 86 throughout its length is bent downwardly and curved to form a bead or trough 88, best seen in Fig. 4; so that any water condensing on the lower surface of the vane or deposited there by the sudden change in direction of the air, and being blown toward its outer edge is caught by this trough-like projection and is conducted downwardly and longitudinally of the blade so that it is returned to the upper hot water trough.

As shown in Fig. 4, the trough 88 of each vane is hooked-shaped in cross section the hook being nearly closed, the free edge 89 of the trough being spaced from the flat undersurface of the vane to provide an inlet 90 through which the water on the undersurface of the vane is forced into the trough.

The amount of water escaping in the form of entrained droplets is extremely small. Practically the only water wasted by the tower is that evaporated for the purpose of cooling, and this cannot be considered as a waste since the evaporation is essential to the cooling of the water, there being but little actual transfer of heat from the water to the air. The loss by evaporation is about .1% per degree temperature change of the water and the total so-called spray loss can be considered as well within 0.05% per hour of the total quantity of water handled.

Although one form of spray eliminator has been described in detail, it is to be understood that the invention is not limited to this specific construction, but includes modifications and changes coming within the scope of the appended claim.

Having thus described the invention, what is claimed as new and desired to be secured by Letters Patent is:

A spray eliminator for liquid cooling towers from which the air discharge flow is substantially linear and vertically upwardly, comprising a single stationary structure of radial vanes disposed conically with the apex extending in the direction of air flow, the whole deflecting surface of each vane being inclined to the general surface of the imaginary cone at a substantial angle, and its trailing edge throughout its length being reentrant on its under side forming a trough open at its outer end, said trough being of a nearly closed hook formation when seen in cross section and adapted to collect water that separates from the air on the under surface of the vane and discharge the same by gravity through its open end.

STEWART CLARK COEY.